United States Patent
Kim et al.

(10) Patent No.: US 9,225,437 B2
(45) Date of Patent: Dec. 29, 2015

(54) CORDLESS CHARGING APPARATUS

(71) Applicant: Samsung Electronics Co., Ltd., Gyeonggi-do (KR)

(72) Inventors: Joon-Il Kim, Seoul (KR); Se-Ho Park, Gyeonggi-do (KR); Sung-Ku Yeo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 114 days.

(21) Appl. No.: 13/943,368

(22) Filed: Jul. 16, 2013

(65) Prior Publication Data

US 2014/0017998 A1    Jan. 16, 2014

(30) Foreign Application Priority Data

Jul. 16, 2012 (KR) .................. 10-2012-0077129

(51) Int. Cl.
*H04B 5/00* (2006.01)
*H04B 15/02* (2006.01)

(52) U.S. Cl.
CPC .............. *H04B 15/02* (2013.01); *H04B 5/0037* (2013.01); *H04B 5/0031* (2013.01)

(58) Field of Classification Search
CPC .................................................. H04B 5/0037
USPC ........................................ 455/41.1, 41.2, 73
See application file for complete search history.

(56) References Cited

U.S. PATENT DOCUMENTS

| | | | |
|---|---|---|---|
| 8,249,502 B2 * | 8/2012 | Savry | ........................... 455/41.1 |
| 2008/0245851 A1 | 10/2008 | Kowalski | |
| 2009/0291635 A1 | 11/2009 | Savry | |
| 2010/0315389 A1 | 12/2010 | Sorrell et al. | |
| 2011/0221390 A1 * | 9/2011 | Won et al. | ...................... 320/108 |
| 2012/0133214 A1 | 5/2012 | Yun et al. | |
| 2012/0193997 A1 | 8/2012 | Hong et al. | |

FOREIGN PATENT DOCUMENTS

| | | |
|---|---|---|
| KR | 1020080032519 | 4/2008 |
| KR | 1020090126323 | 12/2009 |
| KR | 1020110004321 | 1/2011 |
| WO | WO 2008044875 | 4/2008 |
| WO | WO 2010/093973 | 8/2010 |

* cited by examiner

*Primary Examiner* — Tuan H Nguyen
(74) *Attorney, Agent, or Firm* — The Farrell Law Firm, P.C.

(57) ABSTRACT

A cordless charging apparatus is provided. The cordless charging apparatus includes a cordless power reception resonator including a feeding connector for electric feeding, and a ground connector for grounding. The ground connector is spaced apart from a connection terminal connecting the cordless power reception resonator to a circuit.

14 Claims, 4 Drawing Sheets

CORDLESS CHARGING APPARATUS

PRIORITY

This application claims priority under 35 U.S.C. §119(a) to Korean Application Serial No. 10-2012-0077129, which was filed in the Korean Intellectual Property Office on Jul. 16, 2012, the entire content of which is incorporated herein by reference.

BACKGROUND OF THE INVENTION

1. Field of the Invention

The present invention relates generally to a cordless charging apparatus, and more particularly, to a cordless charging apparatus for restricting interference between frequencies of a Near Field Communication (NFC) antenna and a resonator of a cordless charging apparatus.

2. Description of the Related Art

In general, a portable terminal refers to a device by which a user can use a mobile communication function, an electronic note function, an Internet connection, and a multimedia function while carrying the device. Various functions have recently been integrated in one mobile communication terminal, which is generally referred to as a smart phone.

Usually, a traffic card, a visitor verifying security card, a credit card, etc. are used for payment or user verification using NFC. Generally, an NFC function is enabled in each of the portable terminals. Thus, a conventional portable terminal includes a separate antenna for performing an NFC function. NFC technology is disclosed in Korean Patent Application No. 2009-126323. In contrast to short range communication such as Bluetooth® or Zigbee®, a communication setting speed of the NFC between communication devices is quick. However, since the NFC is performed at a relatively low frequency band of 13.56 MHz, it is important to achieve a recognition distance in order to enable the NFC function in a portable terminal. A detachable or embedded battery pack is provided in a portable terminal to supply electric power to the portable terminal. A user may charge the battery pack according to a residual amount of power of the battery. In conventional portable terminals, a battery pack is charged through a separate charger, and efforts for commercializing a cordless charging function are constantly being made for the sake of convenience.

Cordless charging technologies include an inductive coupling method using a magnetic field, a capacitive coupling method using an electric field, and a radio frequency wave radiation method. The inductive coupling method is suitable for cordless charging with respect to power efficiency. The inductive coupling type cordless charging is performed by arranging a primary coil provided in a charger and a secondary coil provided in a terminal. The cordless charging technology is disclosed in Korean Unexamined Patent Publication No. 2008-32519. Meanwhile, in order to enable the NFC function and the cordless charging function in one terminal, an NFC antenna element generally having a loop antenna form and a resonator for cordless charging should be mounted to the terminal.

FIG. 1 is an illustration showing one surface of a cordless charging apparatus according to the related art. FIG. 2 is an illustration showing another surface of the cordless charging apparatus of FIG. 1.

Referring to FIGS. 1 and 2, a cordless charging apparatus 10 is provided on an outer side of an NFC antenna element 16. The cordless charging apparatus 10 includes cordless power reception resonators 12 and 15, and a circuit 11a.

A feeder 13 and a ground 14 (hereinafter, the feeder 13 and the ground 14 will also be referred to as connection terminals 13 and 14) of the cordless power reception resonators 12 and 15 are firmly mounted to a connection terminal 11 connected to the circuit 11a provided on an upper side of the cordless charging apparatus 10 and the NFC antenna 16. That is, the connection terminals 13 and 15 of the cordless charging apparatus 10 and a connection terminal 17 of the NFC antenna 16 are firmly mounted to the connection terminal 11. In more detail, the feeder 13 of the cordless power reception resonators 12 and 15 is provided at one end of the connection terminal 11, and the ground 14 of the cordless power reception resonators 12 and 15 is located close to an opposite side of the connection terminal 11. The feeder 13 and the ground 14 are located close to the connection terminal 11 and face each other. The connection terminal 17 of the NFC antenna 16 is disposed on the connection terminal 11.

Accordingly, the cordless power reception resonators 12 and 15 and a frequency of the NFC antenna 16 electromagnetically interfere with each other severely. That is, performance of the NFC antenna 16 becomes unstable due to a multiplying resonance generated by a frequency radiated from the cordless charging apparatus 10 and a frequency radiated from the NFC antenna 16. Further, an isolation level between the wireless power reception resonators 12 and 15 and the NFC antenna 16 is reduced. Accordingly, a high frequency performance of the cordless power reception resonators 12 and 15 is reduced.

SUMMARY OF THE INVENTION

The present invention has been made to address at least the problems and disadvantages described above, and to provide at least the advantages described below. Accordingly, aspects of the present invention provide a cordless charging apparatus which can minimize an electromagnetic interference between a cordless power reception resonator and an antenna element of an NFC module and provide a stable NFC antenna element according to a frequency band.

An aspect of the present invention is to provide a cordless charging apparatus which can increase an isolation level between an antenna element of an NFC module and a cordless power reception resonator.

Another aspect of the present invention is to provide a cordless charging apparatus which can prevent degradation of the performance of a cordless power reception resonator and maintain a high frequency performance.

According to an aspect of the present invention, there is provided a cordless charging apparatus including a cordless power reception resonator including a feeding connector for electric feeding, and a ground connector for grounding, wherein the ground connector is spaced apart from a connection terminal connecting the cordless power reception resonator to a circuit.

According to another aspect of the present invention, there is provided a cordless charging apparatus including a cordless power reception resonator, wherein a terminal of the cordless power reception resonator is spaced apart from connection ends of internal antenna modules disposed on an inner side of the cordless power reception resonator.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
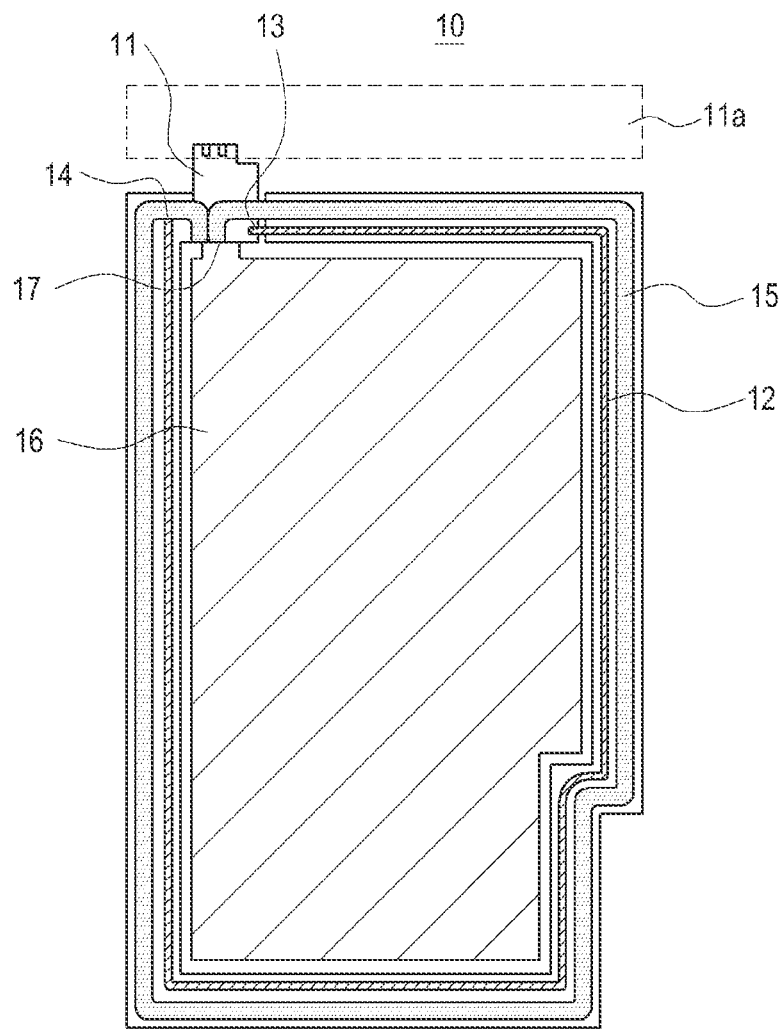
FIG. 1 illustrates one surface of a cordless charging apparatus according to the related art.
Figure 2:
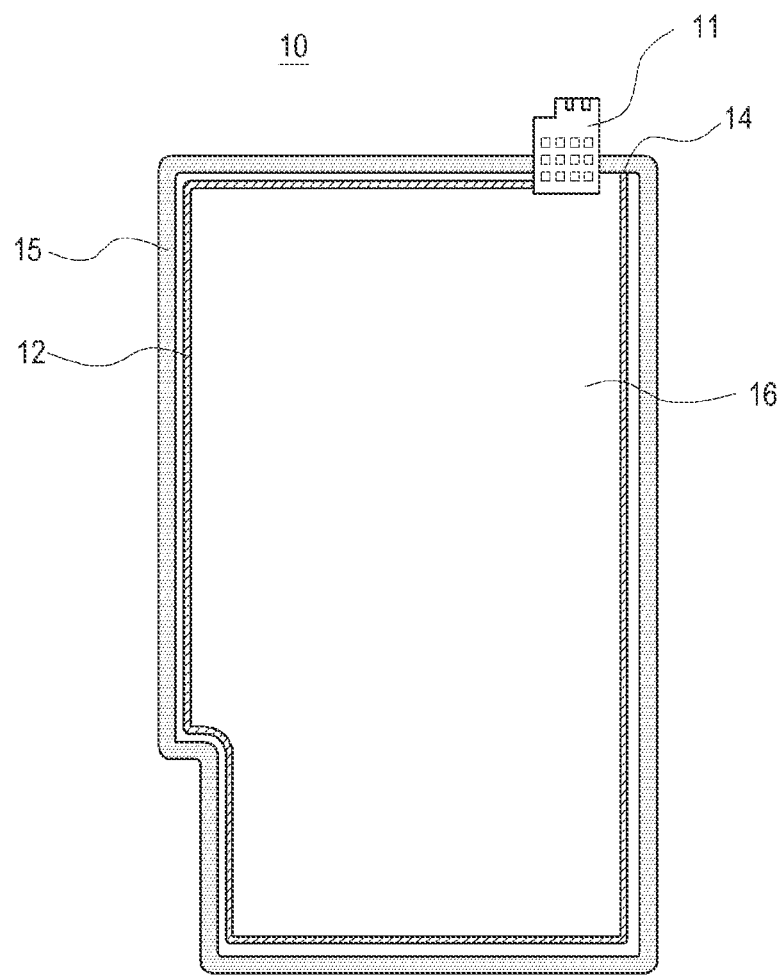
FIG. 2 illustrates another surface of the cordless charging apparatus of FIG. 1.

Hereinafter, embodiments of the present invention will be described with reference to the accompanying drawings. In the description, thicknesses of lines shown in the drawings and sizes of constituent elements may be exaggerated for clarity and convenience. Further, the following terms are defined considering their functions in the present invention and may be varied according to intentions and customs of a user or manager. Thus, the terms should be defined based on the contents of the entire specification. Further, although ordinal numbers such as first and second are used in the description of the embodiments of the present invention, their sequence may be arbitrarily determined and the description of the preceding elements may be applied to the description of the succeeding elements.

Figure 3:
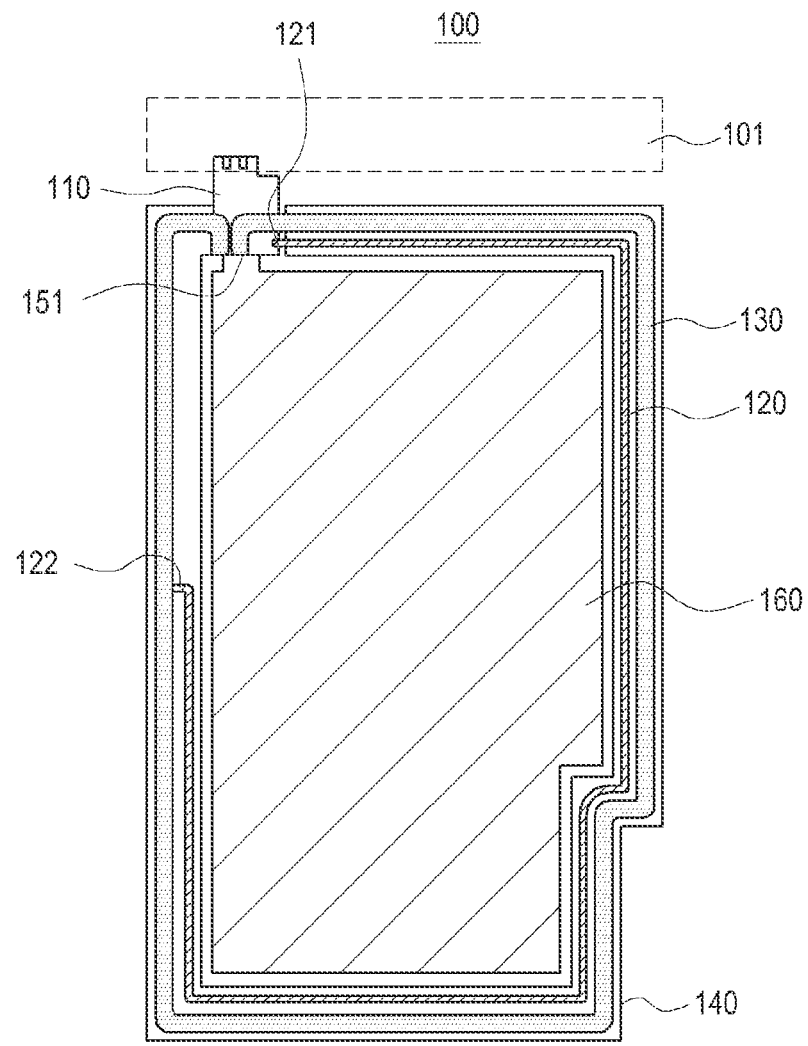
FIG. 3 illustrates one surface of a cordless charging apparatus according to an embodiment of the present invention.
Figure 4:
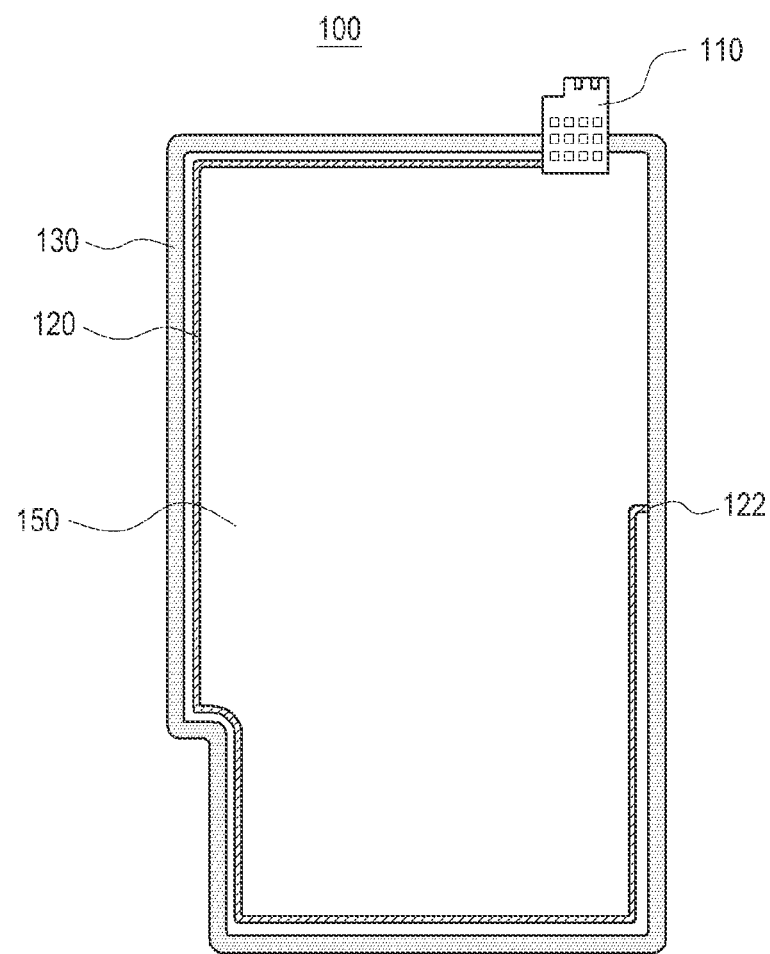
FIG. 4 illustrates another surface of the cordless charging apparatus according to an embodiment of the present invention.

FIG. 3 illustrates one surface of a cordless charging apparatus according to an embodiment of the present invention. FIG. 4 illustrates another surface of the cordless charging apparatus according to the embodiment of the present invention. Referring to FIGS. 3 and 4, the cordless charging apparatus 100 of the present invention is a structure that is disposed on an inner side of an electronic device such as a portable terminal (not shown), and more specifically, on a rear surface of the portable terminal equipped with a battery to be positioned on an external charging pad (not shown) so as to charge the battery. Although not shown, if the portable terminal equipped with the cordless charging apparatus 100 is positioned on the external charging pad, the battery is charged by an electromagnetic field generated between a coil unit (not shown) of the external charging pad and cordless charging reception resonance units 120 and 130.

The cordless charging apparatus 100 includes the cordless charging reception resonator (120 and 130, hereinafter 'charging reception resonance units 120 and 130), a circuit 101, and a shield member 140. In particular, connectors 121 and 122 of the cordless charging reception resonance units 120 and 130 are spaced apart from an internal antenna module disposed on an inner side of the cordless charging apparatus 100, and more specifically, a connection end of an NFC module 160. This is because a frequency generated in a state, in which the cordless charging reception resonance units 120 and 130 are positioned on the external charging pad, can be prevented from interfering with the NFC module 160, specifically, an antenna element of the NFC module, due to a multiplying resonance with an antenna frequency of the NFC module 160. The circuit 101 is disposed on an upper side of the cordless charging reception resonance units 120 and 130, and is electrically connected by a connection terminal 110 provided between the circuit 101 and the cordless charging reception resonance units 120 and 130. The shield member 140 is a structure that interrupts a mutual interference caused by a high frequency wave and a low frequency wave generated by the cordless charging reception resonance units 120 and 130 and an antenna of the NFC module 160 or by an electromagnetic wave generated by electric power, or their influences on circuit units embedded in the portable terminal equipped with the cordless charging apparatus 100. A feeding line 120 and a terminal line 130, which have been described above, are mounted on the shield member 140.

The cordless charging reception resonance units 120 and 130 include the feeding line 120 and a terminal line 130. A space for mounting the NFC module 160 is formed on an inner side of the feeding line 120 and the terminal line 130. That is, the terminal line 130 is formed along a circumference of the NFC module 160 and opposite ends of the terminal line 130 are spaced apart from the connection terminal 110 of the circuit 101 to face each other.

The terminal line 130 is formed along an outer circumference of the feeding line 120, and one end of the feeding line 120 is connected to the terminal line 130 to be grounded. The feeding line 120 is spaced inwardly apart from the terminal line 130 by about 0.1 mm and is formed along an inner circumference of the terminal line 130. Opposite ends of the feeding line 120 are provided with connectors 121 and 122 of the cordless charging reception resonance units 120 and 130. The connectors 121 and 122 of the cordless charging reception resonance units 120 and 130 include a feeding connector 121 and a ground connector 122, which are provided at opposite ends of the feeding line 120.

The feeding connector 121 corresponds to one end of the feeding line 120, and is located adjacent to one side of the connection terminal 110 to supply electricity to the feeding line 120. The ground connector 122 corresponds to an opposite end of the feeding line 120, and is connected to the terminal line 130. The ground connector 122 is located on an opposite side of the connection terminal 110. Since the ground connector 122 is not located adjacent to the connection terminal 110, the ground connector 122 is distant from the feeding connector 121 and from a connection terminal 110 of the NFC module 160, which is also located adjacent to the connection terminal 110. In the embodiment of the present invention, the ground connector 122 is spaced apart from the feeding connector 121 by at least 1 mm, and can be spaced 2 mm. However, the interval between the ground connector 122 and the feeding connector 121 is not limited thereto, and any spacing that can prevent a frequency band of the cordless power reception resonance units 120 and 130 from interfering with a frequency band of the NFC module antenna may be used. In the present invention, when it is said that the ground connector 122 and the feeding connector 121 are spaced apart from each other by at least 1 mm, it means that the ground connector 122 is spaced apart from the connection terminal 151 of the NFC module 160 by at least 1 mm and that the ground connector 122 is spaced apart from the connection terminal 110 by at least 1 mm. In other words, this spaced distance is one in which an interference with the NFC module 160 due to a multiplying resonance is not generated while the cordless charging reception resonance units 120 and 130 are positioned on the external charging pad.

Although, in the embodiment of the present invention, the ground connector 122 is spaced apart from the feeding connector 121 by at least 1 mm or more, the present invention is not limited thereto. That is, since the cordless charging apparatus 100 of the present invention is provided to a portable terminal, the spaced interval is selected to be at least 1 mm, considering the sizes of presently distributed products. That is, for example, it is apparent that spaced distances between the connectors 121 and 122 of the cordless power resonance unit and the connection terminal 151 of the NFC module 160 should be based on the prevention of an interference between the cordless power resonance units 120 and 130 and the NFC module 160 according to a size of the product equipped with the cordless charging apparatus 100. Further, it is apparent that when a configuration mounted to the cordless charging apparatus 100 is not the NFC module 160, any distance by which an interference due to a multiplying resonance of a frequency can be selected as in any other antenna.

In the cordless charging apparatus 100 provided in a portable terminal, frequencies of the cordless power reception resonance units 120 and 130 and the antenna of the NFC module 160 are double frequencies of about 6.78 MHz and 13.56 MHz. A mutual interference between frequencies and unstable system factors of a signal receiving system can be avoided by spacing a terminal connector of a feeding line apart from a mounting location of the connection end of the NFC module 160.

Further, when circuits of the cordless charging reception resonance units 120 and 130 are designed, the cordless charging reception resonance units 120 and 130 can be easily designed, minimizing an influence of a high frequency generated during the driving of the cordless charging apparatus 100.

According to the present invention, an interference between the cordless power reception resonance unit and the NFC module can be avoided, and interference due to a multiplying resonance between an antenna frequency band of the cordless charging apparatus and an antenna frequency band of the NFC module can be minimized.

Accordingly, the NFC module, in particular, an antenna performance of the NFC module, can be stabilized.

In addition, an isolation level between the cordless power reception resonance unit and the NFC antenna can be reduced, and a high frequency performance of the cordless power reception resonance unit can be improved.

In summary, the foregoing description provides embodiments of the present invention and is not used for limiting the protection scope thereof. Any modification, equivalent substitution, or improvement made without departing from the spirit and principle of the present invention should be covered by the protection scope of the following claims of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A cordless charging apparatus for supplying power to be stored by a battery, comprising:
   a cordless power reception resonator including a feeding connector for electric feeding and a ground connector for grounding,
   wherein the ground connector is spaced apart from a connection terminal connecting the cordless power reception resonator to a circuit.

2. The cordless charging apparatus of claim 1, wherein the connection terminal is disposed between the circuit and the wireless power reception resonator, the feeding connector is proximate to one side of the connection terminal, and the ground connector is formed at a location adjacent to a location of the connection terminal to be spaced apart from the connection terminal toward an opposite side of the connection terminal.

3. The cordless charging apparatus of claim 2, wherein the feeding connector and the ground connector are spaced apart from each other by at least 1 mm.

4. The cordless charging apparatus of claim 2, wherein an NFC module is installed on an inner side of the cordless power reception resonator, and a feeding point for supplying electric power to the NFC module is located adjacent to the connection terminal.

5. The cordless charging apparatus of claim 4, wherein the feeding point and the ground connector are spaced apart from each other by at least 1 mm.

6. A cordless charging apparatus for supplying power to be stored by a battery, comprising:
   a cordless power reception resonator,
   wherein a terminal of the cordless power reception resonator is spaced apart from connection ends of internal antenna modules disposed on an inner side of the cordless power reception resonator.

7. The cordless charging apparatus of claim 6, wherein the internal antenna modules comprise an NFC module.

8. The cordless charging apparatus of claim 7, wherein the cordless power reception resonator comprises a terminal line and a feeding line, and the cordless charging apparatus further comprises a circuit connected by a connection terminal to drive the cordless charging resonator.

9. The cordless charging apparatus of claim 8, wherein the terminal line is formed along a circumference of an NFC module such that opposite ends of the terminal line face each other on one side of the connection terminal, the feeding line is provided on an inner side of the terminal line, and terminals of the cordless power reception resonator are provided at opposite ends of the feeding line.

10. The cordless charging apparatus of claim 9, wherein the terminals of the cordless power reception resonator comprise:
    a feeding connector disposed at one end of the feeding line and located adjacent to the one side of the connection terminal to supply electric power; and
    a ground connector disposed at an opposite end of the feeding line and connected to the terminal line to be spaced apart from an opposite side of the connection terminal.

11. The cordless charging apparatus of claim 10, wherein the NFC module is mounted on an inner side of the feeding line and is connected to a circuit through a connection end of the NFC module mounted adjacent to the connection terminal.

12. The cordless charging apparatus of claim 11, wherein the feeding connector and the ground connector are spaced apart from each other by at least 1 mm.

13. The cordless charging apparatus of claim 11, wherein the ground connector is spaced apart from the connection terminal by at least 1 mm.

14. The cordless charging apparatus of claim 8, wherein the terminals of the cordless power reception resonator comprise:
    a feeding connector disposed at one end of a feeding line for supplying electric power and mounted proximate to one side of the connection terminal; and
    a ground connector disposed at an opposite end of the feeding line, connected to a terminal line provided at an outer circumference of the feeding line, and spaced apart from the connection terminal by at least 1 mm toward an opposite side of the connection terminal.

* * * * *